June 1, 1954  D. H. GRIDLEY  2,680,241
POSITION INDICATION DEVICE
Filed June 2, 1949  5 Sheets-Sheet 1

Inventor
DARRIN H. GRIDLEY

By
M. O. Hayes
ATTORNEY

June 1, 1954 D. H. GRIDLEY 2,680,241
POSITION INDICATION DEVICE
Filed June 2, 1949 5 Sheets-Sheet 4

Inventor
DARRIN H. GRIDLEY

By M O Hayes

ATTORNEY

Patented June 1, 1954

2,680,241

UNITED STATES PATENT OFFICE 2,680,241

POSITION INDICATION DEVICE

Darrin H. Gridley, Washington, D. C.

Application June 2, 1949, Serial No. 96,801

10 Claims. (Cl. 340—206)

(Granted under Title 35, U. S. Code (1952), sec. 266)

This invention relates to position sensing devices and in particular to equipment for automatically providing information as a discrete quantity relative to the position of a movable member.

In numerous measuring and computing applications, information is obtained or supplied in the form of variations in the position of a movable shaft. A typical case might involve a directional movable antenna system such as would be employed in a radar system. Where the antenna position must be indicated at some remote point it generally is the practice to use a transmission system such as a selsyn or potentiometer system which can provide visual indication. Such visual indication, even where it is obtained from a meter operated electrically, is not in a convenient form for automatic and rapid manipulation such as is desired in a calculating machine. Many sources of error are involved in conversion and visual detection and mental translation must be employed where a shaft position reading must be made, tabulated, then converted into a form, as by punching a tape, usable by calculating machines.

Accordingly it is an object of this invention to provide information conveying apparatus which will derive such shaft position contained information as a discrete numerical quantity of countable signals.

Another object of the present invention is to provide apparatus which will transfer the position of a mechanical member into a time duration quantity relative to a reference instant in time.

Another object of the present invention is to provide apparatus which will automatically supply a signal in digital form relative to the instantaneous position of a movable member.

Other and further objects and features of the present invention will become apparent upon a careful consideration of the accompanying detailed description and drawing in which.

Fig. 1-A shows typical waveforms illustrative of the action of Fig. 1.

In accordance with the fundamental concepts of the present invention, position indicator apparatus for a movable member is provided in which a reference member, a recording track for example, is caused to move at a known, standard, rate in proximity to a portion or extension of the movable member comprising a first sensing device, namely a recording and reproducing head. A second sensing device, typically also a recording or reproducing head, is fixedly placed near the reference member in a selected referenc position. The position of the first sensing device and hence the position of the movable member is then measured as a function of the interval of time required for the reference member to move from one sensing device to the other. Typically a timing wave of fixed frequency could be produced in the interval of time required for the reference member to move from the first sensing device to the other. With a typical signal thus produced, the number of cycles generated by the timing wave during this interval is a measure of the position of the movable member and will increase when the second sensing device moves in the direction of wheel rotation.

Figure 1:
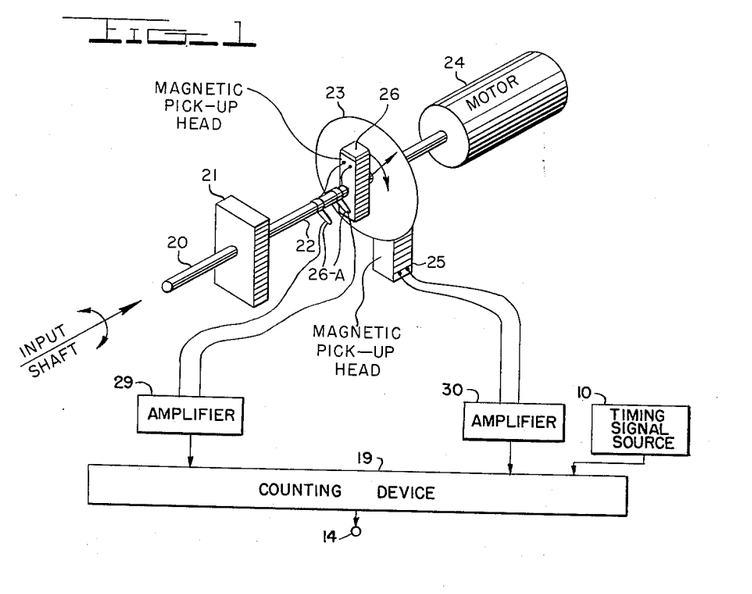
Fig. 1 shows a basic embodiment of the features of the present invention.

With particular reference now to Fig. 1, a basic mechanical embodiment of the features of the present invention is shown in which the movable member whose position must be determined is shaft 20. Shaft 20 is subject to rotational variation and might for example, be an antenna shaft. A suitable bearing or shaft support is indicated by numeral 21. Adjacent to one end 22 of shaft 20 is placed a magnetic recording disc 23 which is provided with rotational motion of a fixed, known speed by a motor 24. To provide constant speed rotation of disc 23 it is preferable that motor 24 be of a polyphase synchronous type having a large amount of inertia so that constant angular velocity is maintained.

Placed near disc 23 is a first magnetic pick-up head 25 which is mounted in a fixed position. A second magnetic pick-up head 26 is attached to the end of shaft 20 and is caused to rotate with shaft 20. Suitable sliding contacts for electrical connections to head 26 are provided on shaft 20 or disc 23 and indicated generally by numerals 26-A.

Figure 1A:
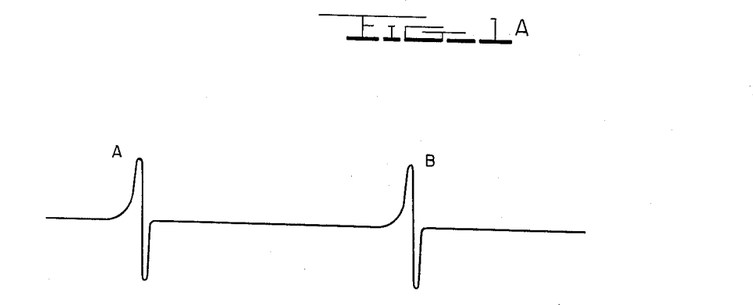

Disc 23 or a coating thereon is of such composition that a short duration magnetic pulse may be recorded thereon as by the energizing of head 26 momentarily. Alternately, a small bar magnet could be cemented or otherwise secured to disc 23 and rotated therewith. Thus upon rotation of disc 23 by motor 24, the passage of this magnetized portion of disc 23 near heads 25 and 26 will induce pulse signals in the heads to produce pulse type output signals therefrom. Suitable time measuring equipment therefore can determine the time lapse between the occurrence of output pulse signals from heads 25 and 26 to determine the spacing and hence the position of the movable head 26 with respect to the fixed position of head 25. This time spacing could be measured by calibrated cathode ray tube presentation however the accuracy of such an apparatus would provide serious limitation to its applicability. Fig. 1-A shows a typical combined output signal as would be obtained from magnetic pick-up heads 25, 26. Pulse A could represent an output signal from head 26 and pulse B could represent an output signal from head 25.

Time measurement may be accomplished by measuring the quantity of signals of a known frequency occurring during the time interval between the production of a signal by the pick-up head 26 and the subsequent signal by pick-up head 25. As will be described later in detail in connection with Fig. 2, known frequency signals are produced by the time source 10 and delivered to counting device 13. Counting device 13 is "gated" to count cycles of known frequency signals occurring between a first signal from pick-up head 26 delivered through output amplifier 29 and a subsequent signal from pick-up head 25 delivered through second output amplifier 30. Output signals regarding the quantity of known frequency signals counted in this interval are delivered at output lead 14 which may be of a multiconductor nature.

Figure 2:
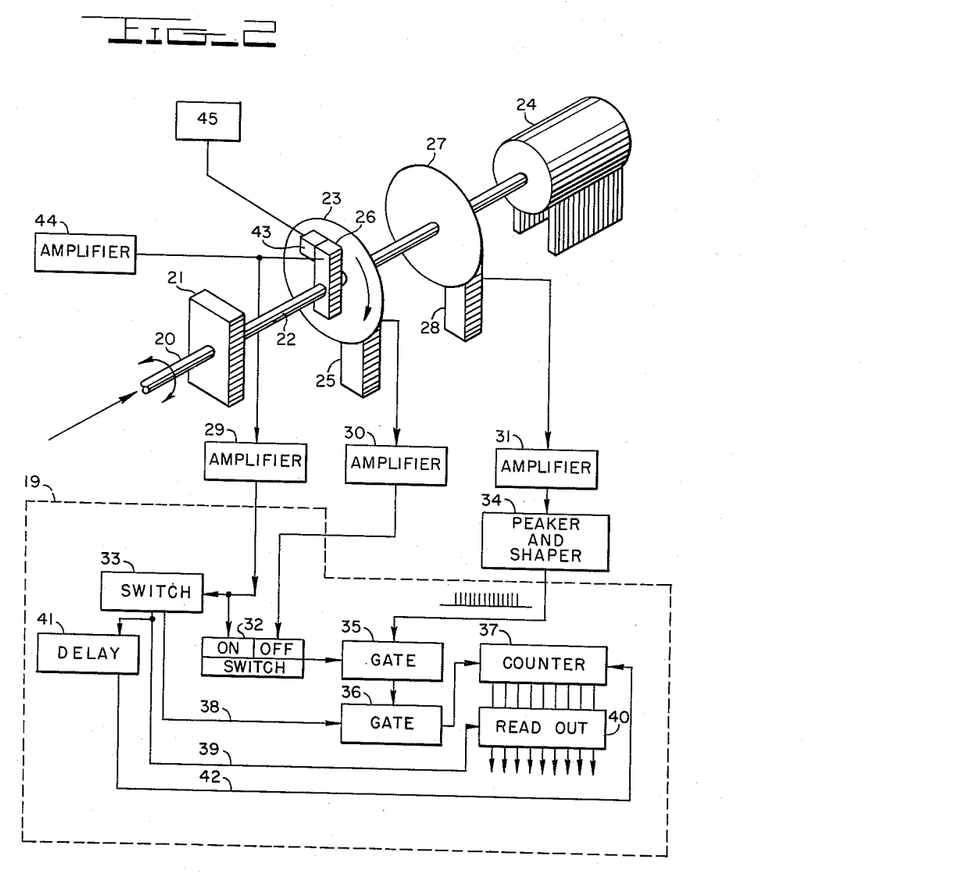
Fig. 2 shows mechanical shaft position sensing equipment designed to produce a binary coded representation of shaft position.

With reference now to Fig. 2, time measuring apparatus for use in combination with pulse production apparatus is shown. To assist in the measurement of the time lapse between the occurrence of the signals from heads 25 and 26, a separate signal track may be provided carrying a timing wave or discrete timing pulses or cycles making up the number of divisions into which the total range of the input position variation is to be divided. Typically if it is desired to be able to determine the position of shaft 20 to an accuracy of one-tenth of one degree, a timing track providing 3600 pulses or cycles in a complete revolution would be required, a timing pulse recorded at each one-tenth degree interval. An alternate timing signal track could contain an 1800 cycle per second sine wave, which when reproduced could be rectified and shaped to give 3600 timing pulses per second. This timing signal track can be placed on disc 23 at a radius thereon different from that employed by the track for heads 25 and 26 or can be carried by a separate disc 27 which is rotated synchronously with disc 23 as shown in Fig. 2. Cooperating with this timing signal track is a third magnetic head 28. The addition of this separate signal track and pick-up head is desirable in many instances to eliminate measurement error due to unavoidable phase velocity variation of the motor 24 at various points of the cycle, such variation is usually present even in synchronous or so-called "constant sped" motors.

Figure 5:
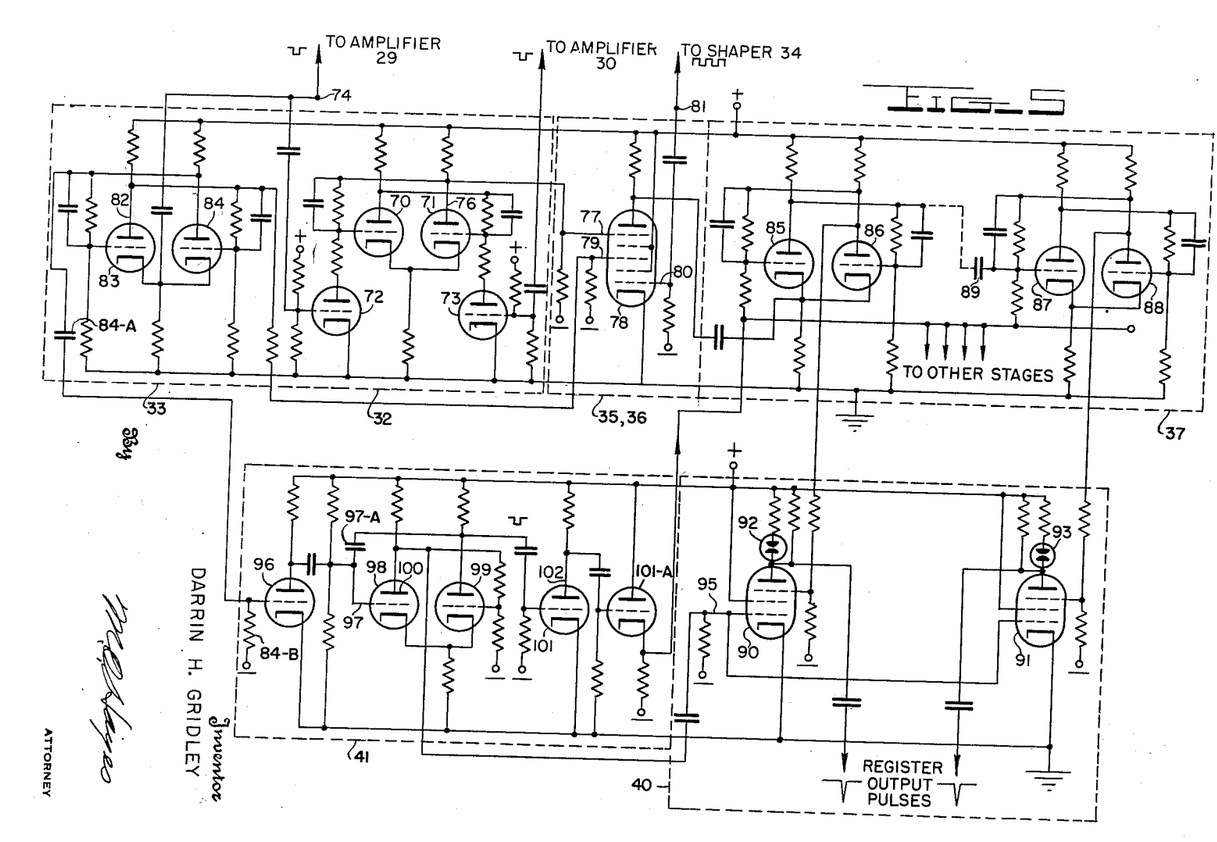
Fig. 5 shows in schematic form part of the apparatus of Fig. 2.

Measurement of the position of shaft 20 is accomplished with the assistance of additional equipment indicated in block form in Fig. 2 and in part in schematic form in Fig. 5. This equipment includes the pick-up amplifiers 29, 30, 31, which amplify independently the signals from heads 26, 25, 28 respectively Amplified signals from amplifiers 29, 30 are applied to a first electronic switch circuit 32 which may typically be of the type having preferably two stable states which may be varied upon the application of input signals. This circuit is placed in a first state (on) by an input signal from amplifier 29 and placed in a second (off) state by an input signal from amplifier 30.

Signals from amplifier 29 are also supplied to a second similar switch circuit 33. Switch circuit 33 is also preferably of a type having two stable states which alternate from one to the other upon application of successive input signals from amplifier 29. Thus switch 33 will be in one state following the application of a first signal from amplifier 29 and in a second state upon the application of a second signal from amplifier 29, reverting to the said one state with the third pulse and continuing alternating operation for successive signals. Circuit details of switch 33 as well as other components of the block 19 are shown in detail in Fig. 5.

Amplified signals from amplifier 31 are applied to waveform shaper circuits 34 which by action which may include differentiation produce a series of timing pulses from the timing signals recorded on disc 27. As mentioned above, for one-tenth degree reading accuracy 3600 pulses are recorded on disc 27, one pulse recorded for each six minutes of angle or a 1800 cycle sine wave could be recorded for operation with rectifiers and shapers. These timing pulses are picked up by head 28 and shaped by circuits 34 and applied through a first gating amplifier 35 controlled by switch 32 and a second gating amplifier circuit 36 controlled by switch 33 to a counter circuit 37 which counts the number of timing pulses appearing in the angle subtended by the instantaneous relative angular position of heads 25 and 26. The total count registered at 37 equals the number of one-tenth degree angular intervals subtended by heads 25 and 26 and therefore is a measure of the angular displacement between the movable head 26 and the reference position head 25.

The actual circuits of blocks may actually comprise a single tube as shown in Fig. 5 to which reference is now made however it is understood that the double gating action indicated by the cascaded blocks 35 and 36 in Fig. 2 could as well be performed by separate gating circuits. Fig. 5 shows in schematic form details of the portion of Fig. 2 enclosed in block 19.

Switch 32 comprises the trigger circuit having tubes 70, 71 and the triggering tubes 72, 73. Tubes 70, 71 are connected in a circuit having two possible stable states, that is, either tube 70 or tube 71 can remain conductive indefinitely or until an externally derived signal changes the conduction condition. Trigger tubes 72, 73 are both normally conductive by virtue of their zero bias connections, however upon application of a negative pulse signal to terminal 74 from amplifier 29 and thence to grid 75, tube 72 is momentarily cut-off producing an increase in the potential at the grid of tube 70 so that regardless of the previous condition of the trigger circuit of tubes 70, 71, tube 70 is rendered conductive. This negative pulse supplied to terminal 74 is the output signal from amplifier 29.

When tube 70 is thus rendered conductive, tube 71 is cut-off producing a high potential at the anode 76 which is communicated to a signal input grid 77 of tube 78. Tube 78 is the main component of gates 35 and 36 in Fig. 2 and is normally held non-conductive by virtue of negative biasing voltages applied to grid 77 and other grids 79, 80. The biasing of all three grids is such that only upon the application of positive signals to all grids simultaneously is tube 78 brought to a condition of anode circuit conductivity. Grid 80 is connected to terminal 81 to receive positive pulse type timing signals from peaker and shaper 34 of Fig. 2 whereas grid 79 is connected to the anode 82 of a second trigger circuit having tubes 83, 84 and corresponding to switch 33 of Fig. 2.

The trigger circuit having tubes 83, 84 is of a type having two possible stable conductivity states, that is, either tube 83 or 84 may be conductive continuously, changing only upon the application of input trigger pulse signals from terminal 74 (amplifier 29 of Fig. 2) applied to the common cathode juncture joint. Thus the trigger circuit of tubes 83, 84 operates back and forth with signals from terminal 74, existing in one conductivity state following the occurrence of a first signal at terminal 74 and reversing conductivity following a second signal and so on. The connection of grid 79 to anode 82 therefore alternately unbiases grid 79 so that tube 78 is unblocked at that grid in alternate time intervals between signals from amplifier 29 or alternate revolutions of disc 23 in Fig. 2.

Summarizing thus far, grid 79 is unblocked in alternate intervals between signals from amplifier 29, grid 80 is unblocked periodically by the pulse signals from peaker and shaper 34 and grid 77 is unblocked upon the occurrence of a signal at terminal 74 to be blocked again when a signal from amplifier 30 applied to the grid of tube 73 causes the trigger circuit of tubes 70, 71 to operate. Therefore tube 78 is brought to anode circuit conductivity upon the occurrence of each timing pulse during alternate intervals between the occurrence of output signals from amplifier 29 and amplifier 30.

The resulting negative pulses at the anode of tube 78 are applied to a chain connected counter circuit which has a sufficient number of stages to provide the possible 3600 binary combinations required to represent the one-tenth degree shaft position. Typically 12 such stages would be required of which the first and last are indicated by the tubes 85, 86 and 87, 88. All stages may be identical and each has two tubes connected in trigger circuit fashion with two stable conductivity states. Initially, before the delivery of a series of pulses from the anode of tube 78, all stages are brought to a reference condition (reset) by apparatus which will be described later. In this reference condition the left hand tubes such as 85, 87 are non-conductive. Thereafter each negative pulse applied to the common cathode connection of tubes 85 and 86 will cause a reversal of the conductive condition therein. The first negative pulse will render tube 85 conductive, and a second pulse will return tube 86 to conduction resulting in the initiation of an elevated voltage condition at the anode of tube 85. This voltage rise is communicated to a subsequent trigger circuit similar to that having tubes 87, 88 by a coupling capacitance typified by 89 to cause action thereof.

Following the occurrence of the series of counter pulses, the various stages of the counter 37 are left in conductivity combinations in dependency on the quantity of signals occurring in the interval between the signals from amplifiers 29 and 30.

Visual indication of the state of the various stages of the counter circuits may be provided by the read-out coincidence circuits having tubes 90, 91, and the neon tube indicators 92, 93. A separate read-out tube such as 90 and neon indicator such as 92 is supplied for each stage of the counter. Each read-out tube such as 90 has a plurality of control grids, one of which (94) receives a signal from the reference conductive tube 86 of the appropriate counter stage.

Grid 95 receives a signal which is timed to occur after the counter stages 37 have completed a counting cycle and before they have returned to their reference state. These signals are derived from switch 33 (tubes 83, 84). Thus when the read-out tubes conduct in response to the input signals the neon tube indicators 92, 93 will glow to indicate that the corresponding counter stage such as 85, 86 is in a condition with tube 85 conductive.

The signals for application to grid 95 and the reset signals to establish reference conditions in counter circuits are derived with additional apparatus as follows. When the trigger circuit of tubes 83, 84 achieves the condition in which tube 83 is conductive, tube 78 is blocked by virtue of a low voltage at grid 79. At this same time a positive signal produced at the anode of tube 84 as tube 84 is cut-off is communicated via a short time constant coupling circuit of capacitance 84–A and resistance 84–B to the grid of a normally non-conductive tube 96. This signal brings tube 96 to momentary conduction producing at the anode thereof a negative signal which is applied to grid 97 of a trigger circuit having tubes 98, 99. This circuit is arranged to have only one stable conductivity condition by reason of the biasing voltages applied thereto, the grid 97 going to a positive voltage obtained from a voltage divider between (B+) and ground while the grid of tube 99 goes to a negative voltage obtained from a voltage divider between the anode 100 and a negative supply. In this stable state tube 98 is conductive, however the negative signal at the anode 96 reverses this condition by cutting off conduction in tube 98 to produce a positive signal at the anode 100. It is this positive signal that is communicated to the grid 95 to permit conduction by tube 90 and tube 91 of the counter read-out circuits so that output signals may be obtained regarding the states of the counter stages of tubes 85—86, 87—88, etc. Following this action and after a short time delay to permit delivery of the output signals as previously mentioned from the tubes 90, 91, etc., the circuit of tubes 98, 99 returns to the stable state as capacitance 97–A discharges after an interval of time determined in part by the time constants of the grid coupling network of tube 98. As the circuit of tubes 98, 99 returns to the stable state and tube 99 cut-off, a positive signal is produced at the anode of tube 99 which is applied to the normally cut-off tube 101 by a short time constant coupling circuit resulting in momentary conduction by tube 101 and in the production of a short duration negative pulse at the anode 102. Anode 102 is coupled to a cathode follower type output tube 101–A the cathode of which is connected to the grid return resistors of the left hand tubes such as 85, 87 in the counter. It is this negative signal delivered in parallel to selected grids (left hand in Fig. 5) of the trigger circuits of the typical tubes 85—86, 87—88 that provides "reset" of the trigger circuits to reference conductivity conditions.

In typical operation then, of the apparatus of Fig. 2 a first signal from amplifier 29 will place switches 32 and 33 in such condition as to render gates 35 and 36 transmissive permitting the delivery therethrough of timing pulses from shaper 34 to counter 37. The succeedent signal from amplifier 30 closes switch 32 and gate 35 (blocks tube 78 at grid 77) thereby terminating the delivery of timing pulses to counter 37. A second control signal from switch 33 coincident with the signal in line 38 closing gate 36 is delivered to line 39 to cause read-out circuits 40 to produce a group of output signals regarding the condition of the individual stages of the circuits of counter 37. The read-out signals may be read visually as shown or delivered to additional apparatus not shown for recording or utilization. Time sharing of the output signals can be employed to deliver them all sequentially into a single line or simultaneously into a plurality of lines. After read-out is obtained the control signal in line 39 from switch 33 is delivered by the delay apparatus 41 and line 42 to cause the counter circuits 37 to return to a reference combination of states to receive a new series of timing signals.

Figure 3:
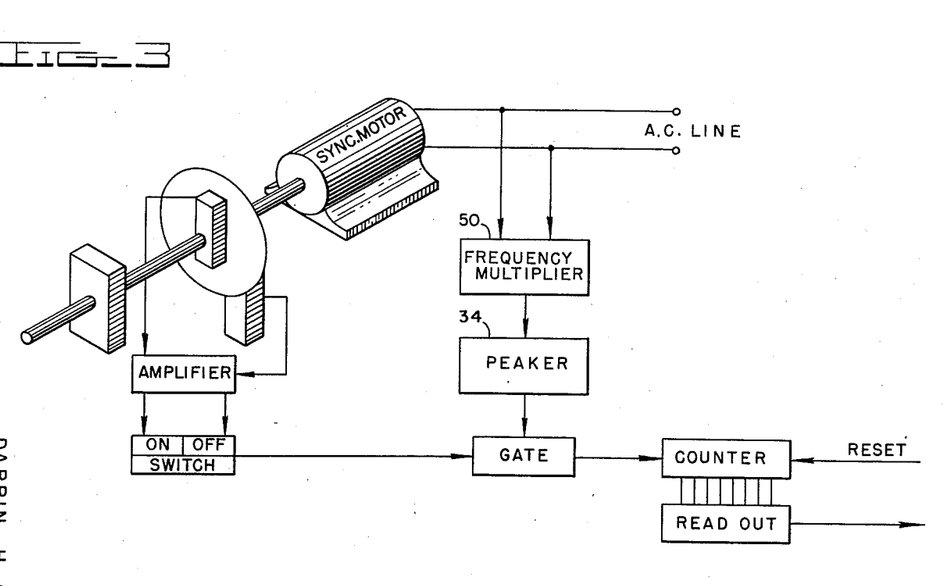
Fig. 3 shows a second mechanical system employing modified timing equipment.

With reference now to Fig. 3 of the drawing, another system for deriving synchronized timing signals is shown. To eliminate the requirement for a separate recording track and pick-up head with its amplifier, the timing signals are derived from the alternating current supply line. Such action could, in certain situations, provide a higher frequency count with consequent possibility of reduction in reading error because the apparatus will not be limited by the frequency response of the magnetic timing signal system. Typically a frequency multiplier 50 could be employed to increase the frequency from a 60 cycle per second line variation to a 108 kc. per second variation to provide a high degree of accuracy in reading. Such an arrangement, however would not provide automatic elimination of error due to variations in the phase velocity of the drive motor and would hence require a moving system having rather high rotational inertia.

The devices of Figs. 1 and 2 both permit position sampling every alternate revolution of the magnetic disc. This is primarily the result of the read-out and reset time requirements of counter 37. With the addition of another switch 32, with adequate gates and an additional counter 37 and read-out apparatus 40, the switch 33 with a second delay apparatus 41 can control alternate operation of the counters to provide an output signal for every revolution of disc 23.

The moving system as thus far described in connection with Fig. 2 requires that the sampling period start when the pick-up head 26 is in register with the magnetized portion of disc 23. This will of course vary the instant in time at which the read out from 40 occurs. Such action may or may not be desirable depending upon the specific application and requirements for cooperation with other similar units which could be combined into a multiplex system. Since it is immaterial whether head 25 or 26 provides the signal which turns switch 32 to the "on" position, the leads from these heads to amplifiers 29 and 30 may be reversed. The net effect is that "read out" from 40 will always occur at the same position of disc 23, and the time measured will be that required for the magnetized spot on the disc to move from head 25 to head 26.

In connection with Fig. 2 an interesting modification can be made which can become particularly useful in a multiplex system. Reference is now made to Fig. 2. To the movable head 26, and in close physical relationship therewith, an erase head 43 is attached. This erase head is provided with rotation from shaft 20.

With this new set-up the operation of the apparatus can become somewhat different from that previously described. When it is desired to determine the position of shaft 20, a pulse signal is delivered to head 26, which may now operate as a "record" head, from amplifier 44, thereby magnetizing a spot on disc 23. This "record" signal is also delivered to amplifier 29 to produce operation of switches 32 and 33 as previously described. When the magnetized spot reaches the position of head 25 due to the rotation of disc 23, the "off" signal is delivered to amplifier 30 and thence to switch 32 as before. As the magnetized spot of disc 23 continues around in the direction indicated by the arrow on disc 23, the "erase" head 43, which may be continually actuated by energy from source 45 will remove the magnetized spot so that the record, playback, erase process may be repeated for every pulse signal delivered from amplifier 44. Such a system could be readily adapted to multiplex operation for the determination of the position of a plurality of shafts.

A multiplex system could conceivably employ a plurality of discs 23, magnetic heads 25, 26, 43 and appropriate counting systems. All of the discs (23) could be driven in synchronism and the pick-up heads (25) placed at somewhat different angular positions with respect to that shown. Thus when a "record" signal is delivered to all "record" heads (26) simultaneously, the pick-up heads (25) will deliver output signals in sequence due to the difference in their angular positions. Positional information is thereby derived relative to the position of all shafts (20) at the same instant.

Figure 4:
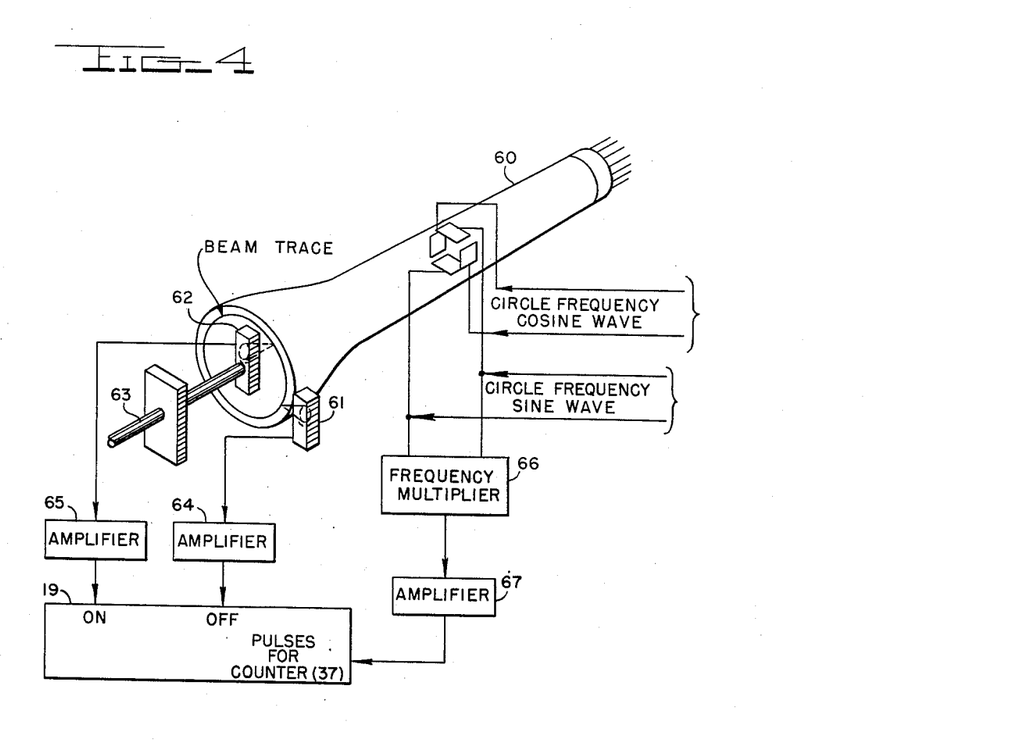
Fig. 4 shows a shaft position sensing device employing photoelectric and cathode ray tube position measuring equipment.

Another embodiment of the basic features of the present invention is shown in Fig. 4. To provide the reference source movable at a uniform velocity, the motion of which is utilized to determine the position of a movable object, a cathode ray tube 60 is employed instead of the constant speed motor and movable recording tracks. Again where it is desired to produce a signal relative to the angular position of a shaft at a given instant, the cathode ray tube beam is caused to follow a circular path by the application of a sinusoidal and cosinusoidal signal to the deflection mechanism associated therewith. With a moving pattern of light thus produced on the face of the tube, suitable fixed reference and movable reference sampling devices such as phototubes 61 and 62 operate as the reference sampling devices (25, 26) in Fig. 2. Motion of the photocell 62 by rotation of shaft 63 alters the point on the face of the tube at which the electron beam of the tube will operate the photocell. With the beam following a circular path at a known constant speed set by the signal input, the time required for the beam to move from one cell, e. g. 62 to the other e. g. 61 will be a direct function of the location of cell 62. This situation is the same as with Figs. 1 and 2 hence the same dual amplifiers 64, 64 corresponding to amplifiers (29, 30) and other components as in block 19 of Fig. 2 could be combined. Since the signal producing the deflection of the electron beam is sinusodial, suitable frequency multiplication in device 66 followed by shaping in amplifier 67 will produce pulse type timing signals required for the operation of a counter such as (37) in Fig. 2. Typically, an output signal produced when the cathode ray tube beam acts upon photo tube 62 will operate the switches (32 and 33), bringing timing switch (32) to the "on" position thereby permitting delivery of timing pulses to the counter (37). Subsequent actuation of phototube 61 when the circularly traveling electron beam of tube 69 reaches phototube 61 will produce a signal which will turn switch 32 "off" terminating the application of pulses to counter (37). Subsequent read-out of the counter condition and reset of the counter to a reference state is produced by switch (33) in response to a second signal from phototube 61.

From the foregoing discussion it is apparent that considerable modification of the features of the present invention is possible without exceeding the scope thereof as defined in the appended claims.

The invention described herein may be manufactured and used by or for the Government of the United States of America for governmental purposes without the payment of any royalties thereon or therefor.

What is claimed is:

1. A position sensing apparatus for determining the position of a pair of relatively movable objects comprising, a position reference means, means moving said reference means in a path portions of which are in proximity to the two objects, means delivering a first signal at such time that a portion of the path of the reference means is near a first one of the objects, means delivering a second signal when this same portion of the path of the reference means is near the second object, pulse generating means producing pulses having a periodic recurrence frequency which is high relative to the velocity of said reference means, pulse counting means, gating means connected between said pulse generating means and said pulse counting means, and means connecting said first and second signal to said gating means for opening the gate in response to said first signal and closing it in response to said second signal.

2. A position sensing apparatus for determining the position of a movable member comprising, a first signal device attached to the movable member and provided with motion thereby, a second signal device having a fixed position near the movable member, a signal track located with portions thereof in proximity to the first and second signal devices, means connected to said signal track moving said signal track at a selected velocity, means delivering a first signal upon the movement of a portion of the signal track to one signal device, means delivering a second signal upon the movement of the same portion of the signal track to the second signal device, pulse generating means producing pulses having a periodic recurrence frequency which is high relative to the velocity of said signal track, pulse counting means, gating means connected between said pulse generating means and said pulse counting means, and means connecting said first and second signals to said gating means for opening the gate in response to said first signal and closing it in response to said second signal.

3. A position sensing apparatus for determining the rotational position of a shaft comprising, a first signal transducer attached to the shaft and provided with rotational motion thereby, a second signal transducer disposed in a fixed position near the shaft, signal track carrying means having a point energy source thereon disposed in operative communication to the first and second transducers, means moving said point energy source at a selected velocity, first output means delivering a first signal upon the movement of the point energy source past the first transducer, second output means delivering a second signal upon the movement of the point energy source past the second signal transducer, pulse generating means producing pulses having a periodic recurrence frequency which is high relative to the velocity of the signal track, pulse counting means, gating means connected between said pulse generating means and said pulse counting means, and means connecting said first and second signals to said gating means for opening the gate in response to said first signal and closing it in response to said second signal.

4. A position sensing apparatus for determining the position of a movable member comprising, a first signal device attached to the movable member and provided with motion thereby, a second signal device having a fixed position near the movable member, a signal track located with portions thereof in proximity to the first and second signal devices, means connected to said signal track moving said signal track at a selected velocity, means delivering a first signal upon the movement of a portion of the signal track to one signal device, means delivering a second signal upon the movement of the same portion of the signal track to the second signal device, pulse generating means producing pulses having a periodic recurrent frequency which is high relative to the velocity of said signal track, pulse counting means, first and second gating means serially connected between said pulse generating means and said pulse counting means, and means connecting said first and second signals to said first gating means for opening the gate in response to said first signal and closing it in response to said second signal, and means connecting siad first signal to said second gating means for alternately opening and closing the gate with successive occurrences of said first signal.

5. A position sensing apparatus for determining the rotational position of a shaft comprising, a first signal transducer attached to the shaft and provided with rotational motion thereby, signal track carrying means disposed for rotation about an axis coaxial with said shaft, means for driving said track at a contant velocity, a point energy source disposed on said track so as to pass each of said transducers once for each revolution of the track and produce an output signal at each transducer coincidental with the passing thereof, pulse generating means producing pulses having a periodic recurrence frequency which is high relative to the velocity of said signal track, pulse counting means, first and second gating means serially connected between said pulse generating means and said pulse counting means, means connecting the outputs of said transducers to said first gating means to open the gate in response to the output of said first transducer and close it in response to the output of the second, and means connecting said first transducer to said second gating means for alternately opening and closing the gate with successive occurrences of a signal at said first transducer.

6. A position sensing apparatus for determining the rotational position of a shaft comprising, a first signal transducer having a fixed position near said shaft, a second signal transducer attached to the shaft and provided with rotational motion thereby, signal track carrying means including first and second signal tracks disposed in operative communication to the first and second transducers, driver means moving said signal track carrying means at a selected velocity, means delivering a first signal upon the movement of a selected portion of the first signal track past one signal transducer, means delivering a second signal upon the movement of the same portion of the first signal track past the other signal transducer, said aforementioned second signal track carrying recorded timing signals thereon and provided with rotation related to the first signal track by the aforesaid driver means, a third signal transducer operatively communicating with the second signal track to reproduce timing signals therefrom with motion thereof, signal gating means fed by the third transducer responsive to the first signal and to the second signal to deliver timing signals in the interval therebetween, and a counter deriving output signals in dependency on the number of pulse timing signals derived from said gating means.

7. A position sensing apparatus for determining the rotational position of a shaft comprising, a first pick-up device having a fixed position near said shaft, a second pick-up device attached to the shaft and provided with rotational motion thereby, a signal track carrying member located with portions thereof in proximity to the first and second pick-up devices, driver means moving said signal track carrying member at a selected velocity, first signal means associated with a first one of the aforementioned pick-up devices for recording a signal on the signal track at a selected instant of time, other signal means associated with the other one of the aforementioned pick-up devices producing a control signal when the signal recorded on the moving sound track reaches the second signal device, auxiliary signal means associated with the first pick-up device preceding the first signal means for removing recorded signals from the signal track, and time measuring means producing output signals in dependency on the time spacing between the selected instant of time and the production of the control signal.

8. A position sensing apparatus for determining the rotational position of a shaft comprising, a first pick-up device disposed in fixed relation to the shaft, a second pickup device attached to the shaft and provided with rotational motion thereby, a signal track carrying member located with portions thereof in proximity to the first and second pick-up devices, driver means moving said signal track carrying member at a selected velocity, first signal means associated with a first one of the aforementioned pick-up devices for recording a first signal on the signal track at a selected instant of time, second signal means associated with the other one of the aforementioned pick-up devices producing a control signal when the signal recorded on the moving sound track reaches the other signal device, auxiliary signal means associated with the first pick-up device preceding the first signal means for removing recorded signals from the signal track, a second signal track carrying member having timing signals recorded thereon, said aforementioned second track member provided with rotation relative to the first signal track by the aforesaid driver means, a third pick-up device cooperative with the second signal track to produce timing signals therefrom with motion thereof, signal gating means fed by said third pick-up device responsive to the first signal and to the control signal to deliver timing signals in the interval therebetween, and a counter deriving output signals in dependency on the number of pulse signals derived from said gating means.

9. A position sensing apparatus for determining the rotational position of a shaft comprising, a cathode ray tube producing an electron beam disposed adjacent the end of the shaft, electron directive means producing a circular sweep of the electron beam on the face of the cathode ray tube, a photoelectric responsive device attached to the shaft and movable therewith along the path of the electron beam, said photoelectric device being operative to produce a signal when the electron beam reaches the locality thereof, a second photoelectric responsive device disposed to receive energy in a narrow cone from a known position of the cathode ray tube beam and responsive when the electron beam reaches the locality thereof to produce an output pulse, and means responsive to produce output signals in dependency on the time spacing between the signals produced by the photoelectric responsive devices.

10. A position sensing apparatus for determining the rotational position of a shaft comprising, a cathode ray tube disposed adjacent the end of the shaft, electron directive means producing a circular sweep of the cathode tube electron beam on the face of the cathode ray tube, a photoelectric responsive device attached to the shaft and movable therewith in the path of the electron beam, said photoelectric device being operative to produce a signal when the electron beam reaches the locality thereof, a second photoelectric responsive device disposed to receive light in a narrow cone from a known position of the cathode ray tube beam and responsive when the electron beam reaches the locality thereof to produce an output pulse, frequency multiplying means operative to produce a timing signal having a frequency harmonically related to the frequency of the circular trace of the electron beam, signal gating means fed by said timing signal operative in response to successive signals derived from the photoelectric responsive devices to deliver output pulse timing signals in the interval therebetween, and a counter deriving output signals in dependency on the number of pulse timing signals derived from said gating means in the interval between successive outputs from said photoelectric devices.

References Cited in the file of this patent

UNITED STATES PATENTS

| Number | Name | Date |
| --- | --- | --- |
| 2,089,441 | Smith | Aug. 10, 1937 |
| 2,110,746 | Tolson | Mar. 5, 1938 |
| 2,168,149 | Arnold | Aug. 1, 1939 |
| 2,332,300 | Cook | Oct. 19, 1943 |
| 2,332,775 | Bell | Oct. 26, 1943 |
| 2,370,134 | Begun | Feb. 27, 1945 |
| 2,370,176 | Kornei | Feb. 27, 1945 |
| 2,397,604 | Hartley | Apr. 2, 1946 |
| 2,420,509 | Whittaker | May 13, 1947 |
| 2,431,591 | Snyder | Nov. 25, 1947 |
| 2,485,245 | Schoenbaum | Oct. 18, 1949 |